US006385026B1

(12) United States Patent
Yamaguchi

(10) Patent No.: US 6,385,026 B1
(45) Date of Patent: May 7, 2002

(54) CIRCUIT BREAKER

(75) Inventor: Noboru Yamaguchi, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/612,228

(22) Filed: Jul. 7, 2000

(30) Foreign Application Priority Data

Jul. 7, 1999 (JP) .......................................... 11-193471

(51) Int. Cl.[7] .................................................. H02H 5/00
(52) U.S. Cl. ....................................... 361/103; 361/106
(58) Field of Search ................................ 361/103, 106, 361/120, 124, 118, 38, 58, 93.1, 115

(56) References Cited

U.S. PATENT DOCUMENTS 4,479,105 A * 10/1984 Banes ........................... 337/4
5,454,363 A * 10/1995 Sata ...................... 126/263.01

* cited by examiner

*Primary Examiner*—Stephen W. Jackson
(74) *Attorney, Agent, or Firm*—Finnegan, Henderson, Farabow, Garrett, & Dunner, L.L.P.

(57) ABSTRACT

A cap 14*a* and a resin case 14*b* accommodate a thermite case 26 and an ignition 29, the thermite case 26 comes into contact with a first buss bar 11*a* and a second buss bar 19*a*, and a heating agent 27 is charged into the thermite case 26. A retainer 45 which can be attached to and detached from the resin case 14*b* mounts a compression spring 39*a* in its compressed state. When the retainer 45 is mounted to the resin case 14*b*, the retainer 45 comes into contact with the thermite case 26. If the ignition 29 is ignited by a signal indicative of an abnormal condition sent from outside, the heating agent 27 is heated, the retainer 45 is melted by the heat, the compression spring 39*a* is stretched and the thermite case 26 jumps up. Therefore, the electrical connection between the thermite case 26 and the first buss bar 11*a* and the second buss bar 19*a* is interrupted.

5 Claims, 5 Drawing Sheets

CIRCUIT BREAKER

BACKGROUND OF THE INVENTION

1. Field of the Invention

The present invention relates to a circuit breaker for interrupting an electric circuit for a short time.

2. Description of the Related Art

In an electrical component system provided in a vehicle, when something is wrong with a load of a power window, a wire harness, or the like, constituted by a plurality of electric wires connecting a battery and various loads, a high-current fuse inserted between the battery and the wire harness is blown out to interrupt a connection between the battery and the wire harness, thereby preventing the loads, the wire harness, and the like from being burnt and damaged.

However, in the case of the electric component system using such a high-current fuse, even if something is wrong with the load of the power window, the wire harness, or the like connecting the battery and various loads, the fuse does not blow out unless a current exceeds a tolerated value which is previously set for the high-current fuse. Therefore, various protecting apparatuses have been developed. When a high-current close to the tolerated value is continuously flowing, the protecting apparatus detects the current and interrupts the connection between the battery and the wire harness.

FIG. 1 is a sectional view showing one example of the protecting apparatus using a bimetal. The protecting apparatus shown in FIG. 1 is made of insulation resin, and comprises a housing 103 formed at its upper portion with a fuse accommodating portion 102, a lid 113 for closing the fuse accommodating portion 102 such that the latter can be opened and closed, a power source terminal 105 disposed in a lower portion in the housing 103 such that an upper end of the power source terminal 105 projects into the fuse accommodating portion 102 and a lower end thereof is exposed outside, and the exposed portion of the power source terminal 105 being connected to a positive terminal of a battery 104, a load terminal 109 disposed in a lower portion in the housing 103 such that an upper end of the load terminal 109 projects into the fuse accommodating portion 102 and a lower end thereof is exposed outside, and the exposed portion of the load terminal 109 being connected to a load 108 through an electric wire 107 constituting a wire harness 106, a fusible member 110 made of low-melting metal and having one end connected to an upper end of the power source terminal 105 and the other end connected to an upper end of the load terminal 109, an intermediate terminal 111 disposed in a lower portion in the housing 103 such that the intermediate terminal 111 is located at an intermediate position between the power source terminal 105 and the load terminal 109 and a lower end of the intermediate terminal 111 is exposed outside, and the exposed portion being connected to a negative terminal of the battery 104, and a bimetal 112 which is made of a long plate-like member comprising two kinds of metal bonded together and which is disposed such as to be opposed to the fusible member 110 such that a lower end of the bimetal 112 is connected to an upper end of the intermediate terminal Ill and an upper end thereof being bent into an L-shape.

When an ignition switch and the like of the vehicle are operated, and a current is flowing through a path comprising the positive terminal of the battery 104, the power source terminal 105, the fusible member 110, the load terminal 109, the electric wire 107 of the wire harness 106, the load 108, and the negative terminal of the battery 104, and when an abnormal condition occurs in the load 108 or in the wire harness 106 connecting the load 108 and a protecting apparatus 101, and a current equal to or greater than the tolerated value flows through the fusible member 110, the fusible member 110 is heated and blown out for protecting the load 108, the wire harness 106 and the like.

Further, even if something is wrong with the load 108 or the wire harness 106 connecting the load 108 and the protecting apparatus 101, and a large current flows through the fusible member 110, if the current does not exceed the tolerated value, the fusible member 110 is heated by the current flowing through the latter and the bimetal 112 starts deforming. When a predetermined time is elapsed from the instance when the large current starts flowing through the fusible member 110, a tip end of the bimetal 112 comes into contact with the fusible member 110, and a large short-circuit current flows through the fusible member 110 in a path comprising the positive terminal of the battery 104, the power source terminal 105, the fusible member 110, the intermediate terminal 111, and the negative terminal of the battery 104, and the latter is blown out.

With the above structure, even when a current equal to or lower than the tolerated value flows for a preset time or longer, the circuit is interrupted to protect the wire harness 106 and the load 108.

As another protecting apparatus 101 rather than this protecting apparatus, a protecting apparatus 121 has also developed.

The protecting apparatus 121 shown in FIG. 2 comprises a housing 122 made of insulation resin, a power source terminal 124 embedded in one side surface of the housing 122 and having a lower end connected to a positive terminal of a battery 123, and a load terminal 128 embedded in the other side surface of the housing 122 and having a lower end connected to a load 127 through an electric wire 126 constituting a wire harness 125. The protecting apparatus 121 further comprises an electric wire 131 including a fusible lead 129 which is made of low-melting metal and formed into U-shape and a heat-proof coating 130 formed such as to cover the fusible lead 129. The protecting apparatus 121 further comprises a coil 132. The coil 132 is made of shape-memory alloy which is formed into a shape wound around the electric wire 131 as shown in FIG. 2 when it is in a martensite phase state, and which is formed into its original phase shape fastening the electric wire 131. The protecting apparatus 121 further comprises an external terminal 133 whose upper end is connected to one end of the coil 132 and whose lower end is connected to a negative terminal of the battery 123.

When an ignition switch and the like of the vehicle are operated, and a current is flowing through a path comprising the positive terminal of the battery 123, the power source terminal 124, the fusible lead 129 of the electric wire 131, the load terminal 128, the electric wire 126 of the wire harness 125, the load 127 and the negative terminal of the battery 123, and when an abnormal condition occurs in the load 127 or in the wire harness 125 connecting the load 127 and a protecting apparatus 121, and a current equal to or greater than the tolerated value flows through the fusible lead 129, the fusible lead 129 is heated and blown out for protecting the load 127, the wire harness 125 and the like.

Further, even if something is wrong with the load 127 or the wire harness 125 connecting the load 127 and the protecting apparatus 121, and a large current flows through the fusible lead 129, if the current does not exceed the tolerated value, the fusible lead 129 is heated by the current flowing through the latter and a temperature of the coil 132 rises. When a predetermined time is elapsed from the instant when the large current starts flowing through the fusible lead 129, and the temperature of the coil 132 rises to 120° C. to 170° C., the coil 132 changes from its martensite phase state to its original phase and bites into the heat-proof coating 130 which is softened by heat and comes into contact with the fusible lead 129, and a large short-circuit current flows through the fusible lead 129 in a path comprising the positive terminal of the battery 123, the power source terminal 124, the fusible lead 129, the coil 132, the external terminal 133, and the negative terminal of the battery 123, and the latter is blown out.

With the above structure, even when a current equal to or lower than the tolerated value flows for a preset time or longer, the circuit is interrupted to protect the wire harness 125 and the load 127.

However, in the above-described conventional protecting apparatuses 101 and 121, there are problems as follows.

First, in the case of the protecting apparatus shown in FIG. 1, it is detected whether a large current flows through the fusible member 110 using the bimetal 112 made of two kinds of metals having different thermal expansion coefficients and bonded to each other. Therefore, if the magnitude of the current flowing through the fusible member 110, the bimetal 112 is deformed, and the time that elapsed before the circuit is interrupted is varied.

Thus, when a failure that a large current flows intermittently occurs, a temperature of the fusible member 110 does not rise more than a certain value, and there is an adverse possibility that the wire harness 106 or the load 108 may be burnt before the protecting apparatus 101 interrupts the circuit.

In the case of the protecting apparatus 121 shown in FIG. 2, it is detected whether a large current flows through the fusible lead 129 using the coil 132 made of shape-memory alloy. Therefore, if the magnitude of the current flowing through the fusible lead 129, the coil 132 is deformed, and the time that elapsed before the circuit is interrupted is varied.

Thus, when a failure that a large current flows intermittently occurs, a temperature of the fusible lead 129 does not rise more than a certain value, and there is an adverse possibility that the wire harness 125 or the load 127 may be burnt before the protecting apparatus 121 interrupts the circuit.

Further, in the protecting apparatuses shown in FIGS. 1 and 2, the heat reaction time of the bimetal 112 or the coil 132 which is a thermal-deformable electrical conduction member is varied depending upon the current flowing therethrough. Further, the heat reaction of the thermal-deformable electrical conduction member is not operated timely when an abnormal condition occurs.

SUMMARY OF THE INVENTION

It is an object of the present invention to provide a circuit breaker capable of reliably interrupting a circuit in a short time to protect an electrical part when an abnormal signal of a vehicle is input.

To achieve the above object, according to a first aspect of the present invention, there is provided a circuit breaker comprising a heating portion disposed between a first connecting terminal and a second connecting terminal, the heating portion being in contact with the first connecting terminal and the second connecting terminal and having electric conductivity and charged with a heating agent, an igniting portion for igniting the heating agent charged in the heating portion, an outer case in which the igniting portion and the heating portion are accommodated, an extendable resilient member, and a removable member for mounting the resilient member in its compressed state, the removable member being capable of being attached to and detached from the outer case, and being disposed in the vicinity or in contact with the heating portion when the removable member is mounted to the outer case.

According to the first aspect, the removable member which mounts the extendable resilient ember is disposed in the vicinity of or in contact with the heating portion when the removable member is mounted to the outer case. When the igniting portion is ignited by the signal indicative of the abnormal condition sent from outside, the heating agent charged in the heating portion is heated, and the removable member is melted by the heat. The compressed resilient member is stretched to jump up the heating portion and therefore, the electric connection between the heating portion and the first and second connecting terminals is interrupted. Therefore, it is possible to reliably interrupt the electric circuit of the vehicle within a short time, and to protect electrical parts.

Further, since the removable member is attachable to and detachable from the outer case, the removable member can easily be attached to and detached from the outer case. Further, the resilient member is held by the removable member and thus, no external force is applied to the connected portion between the first and second connecting terminals and the heating portion.

According to a second aspect of the invention, the outer case comprises an upper case and a lower case put on the upper case, the lower case being formed with an opening and a groove, and the removable member to which the resilient member is mounted has a case mounting claw which is fitted to the groove, and is formed such that the removable member can be inserted into the opening.

According to the second aspect, the removable member can easily be mounted to the lower case by inserting the removable member to which the resilient member is mounted into the opening formed in the lower case, and by fitting the case mounting claw formed on the removable member into the groove formed in the lower case. Therefore, it is possible to easily assemble the entire apparatus.

According to a third aspect of the invention, the removable member comprises a base, a belly which is embedded with respect to the base and around which the resilient member is wound, a locking portion formed on an end of the belly for locking the resilient member in its compressed state, and the case mounting claw.

According to the third aspect, the resilient member is wound around the belly by bending the locking portion inwardly and pushing the resilient member into the belly through the locking portion, and the resilient member is locked by the locking portion in its compressed state. That is, since the locking portion is disposed inside the resilient member, the locking portion comes into strong contact with the heating portion, and the heat conductivity becomes excellent. Further, the resilient member is held by the removable member, no external force is applied to the connected portion between the first and second connecting terminals and the heating portion.

According to a fourth aspect of the invention, the locking portion is made of a low-melting metal or resin member which is melted by a heat of the heating agent.

According to the fourth aspect, since the locking portion is made of a low-melting metal or resin member which is melted by a heat of the heating agent, the locking portion is melted by the heat of the heating agent, the resilient member is stretched, the heating portion jumps up, and the electric connection between the first and second connecting terminals is interrupted.

According to a fifth aspect of the invention, an end of the heating portion is formed with a side wall, the side wall and tip ends of the first connecting terminal and the second connecting terminal are connected to each other through low-melting material.

According to the fifth aspect, since the side wall and tip ends of the first connecting terminal and the second connecting terminal are connected to each other through low-melting material, if the removable member and the low-melting material are melted by the heat of the heating agent, the heating portion jumps up, and the electric connection between the first and second connecting terminals is interrupted. Therefore, it is possible to reliably interrupt the electric circuit of the vehicle within a short time, and to protect electrical parts. Further, no spring force is applied to the low-melting material which is the connected portion between the first and second connecting terminals and the heating portion, it is possible to enhance the reliability of the connected portion.

DETAILED DESCRIPTION OF THE PREFERRED EMBODIMENT

Figure 1:
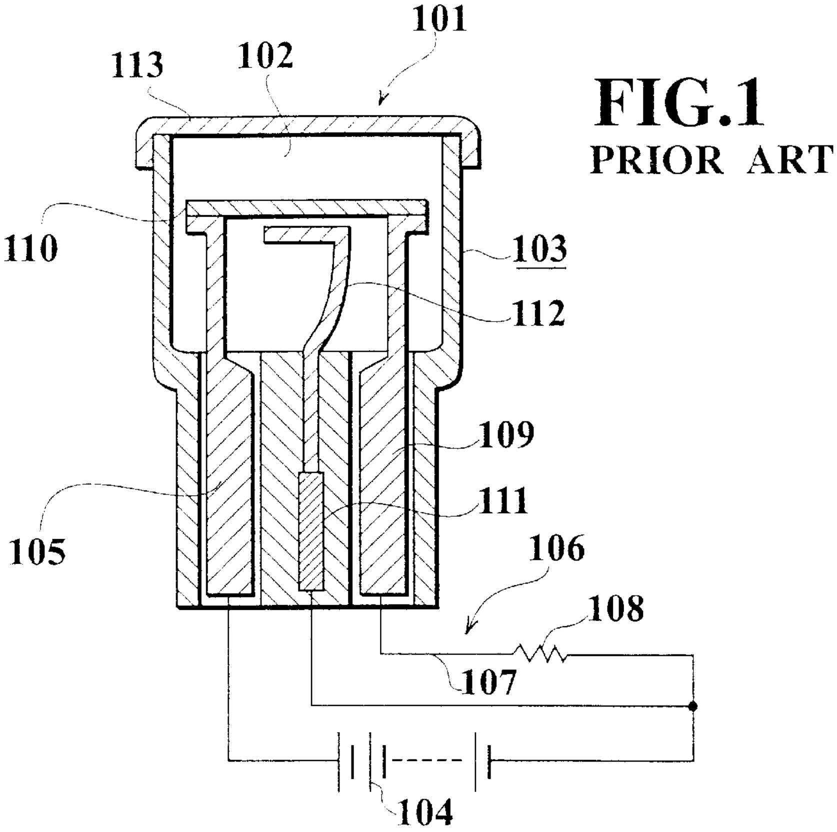
FIG.1 PRIOR ART
FIG. 1 is a sectional view showing one example of a conventional protecting apparatus using a bimetal.
Figure 2:
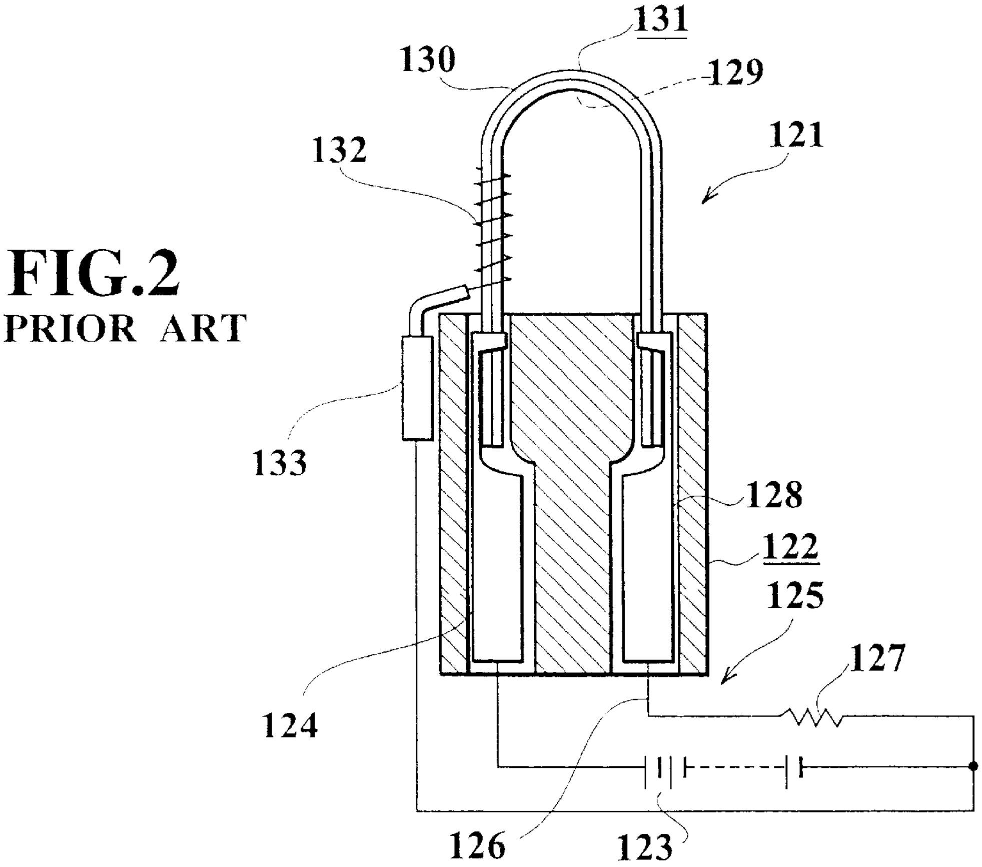
FIG.2 PRIOR ART
FIG. 2 is a sectional view showing another example of the conventional protecting apparatus.
Figure 3:
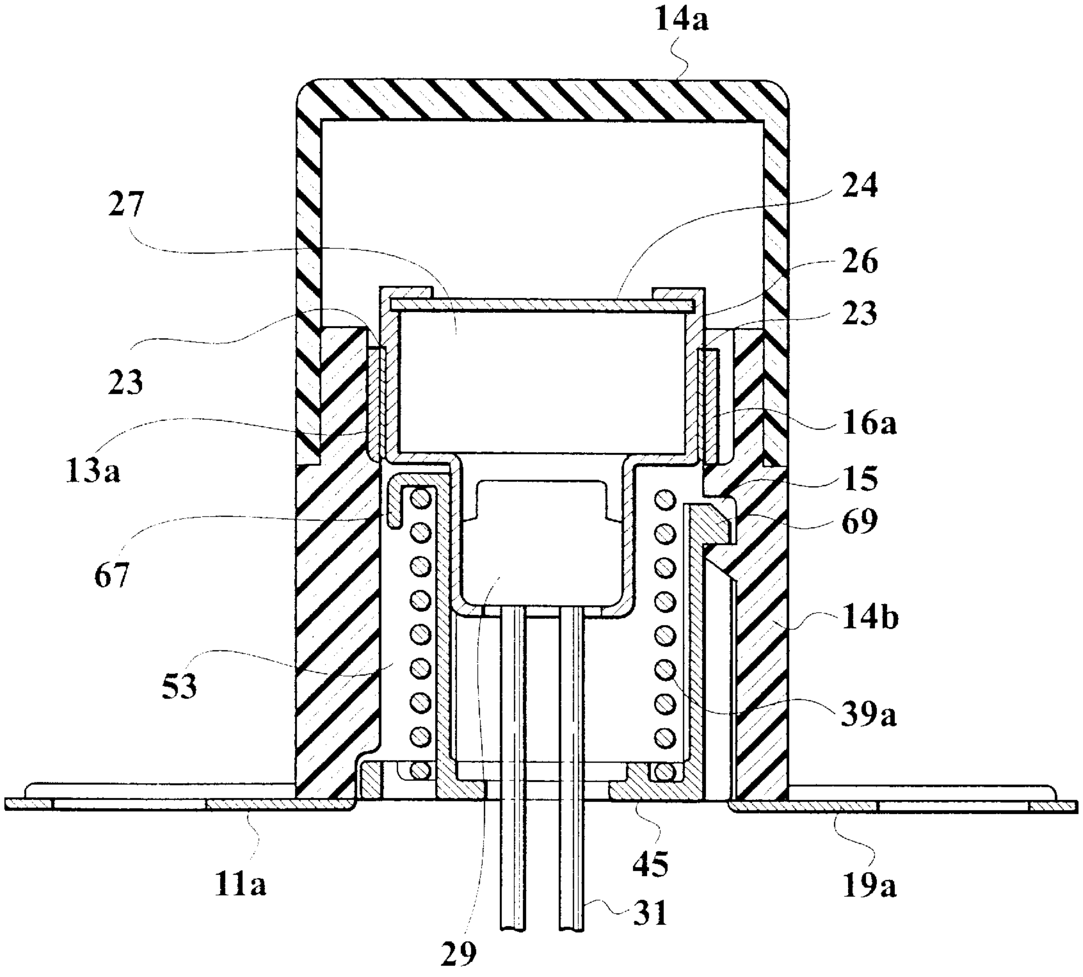
FIG. 3 is a sectional view of a circuit breaker of an embodiment before the circuit is interrupted.
Figure 5:
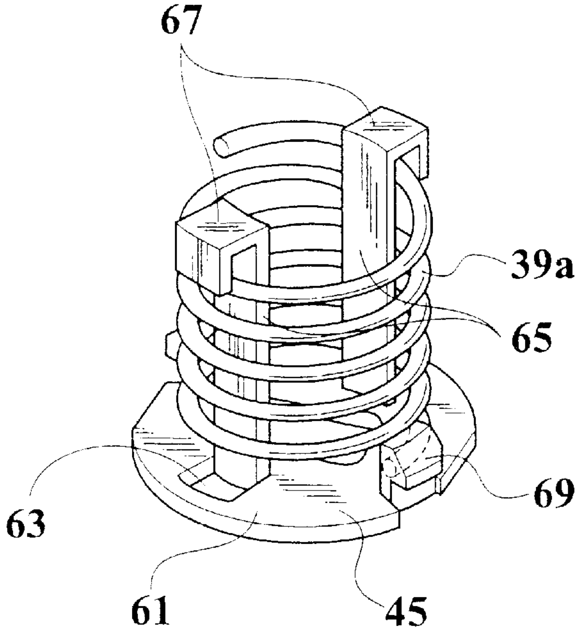
FIG. 5 is a view of a retainer of the circuit breaker of the embodiment before the circuit is interrupted.
Figure 6:
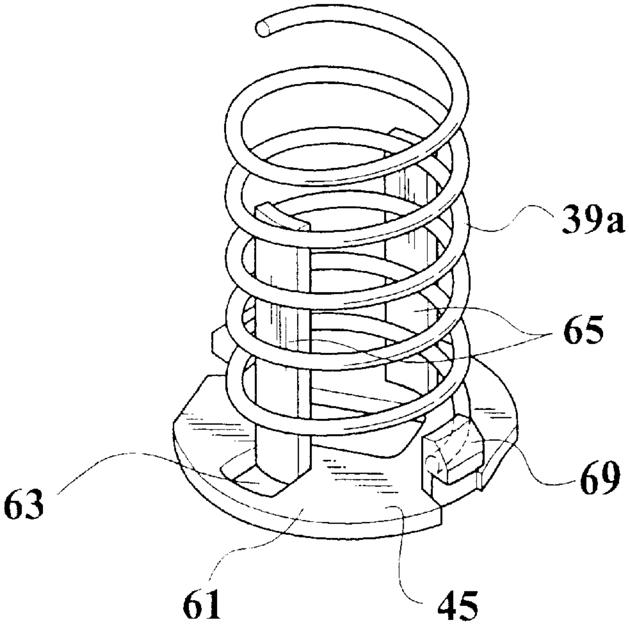
FIG. 6 is a view of the retainer of the circuit breaker of the embodiment after the circuit is interrupted.

An embodiment of a circuit breaker of the present invention will be explained in detail with reference to the drawings. FIG. 3 is a sectional view of a circuit breaker of an embodiment before the circuit is interrupted, FIG. 4 is an exploded perspective view of the circuit breaker of the embodiment, FIG. 5 is a view of a retainer of the circuit breaker of the embodiment before the circuit is interrupted, and FIG. 6 is a view of the retainer of the circuit breaker of the embodiment after the circuit is interrupted.

In the circuit breaker shown in FIG. 3, a plate-like long first buss bar 11*a* is made of, for example, copper or copper alloy and is connected to a battery (not shown). A plate-like long second buss bar 19*a* is also made of, for example, copper or copper alloy and is connected to a load (not shown).

Figure 4:
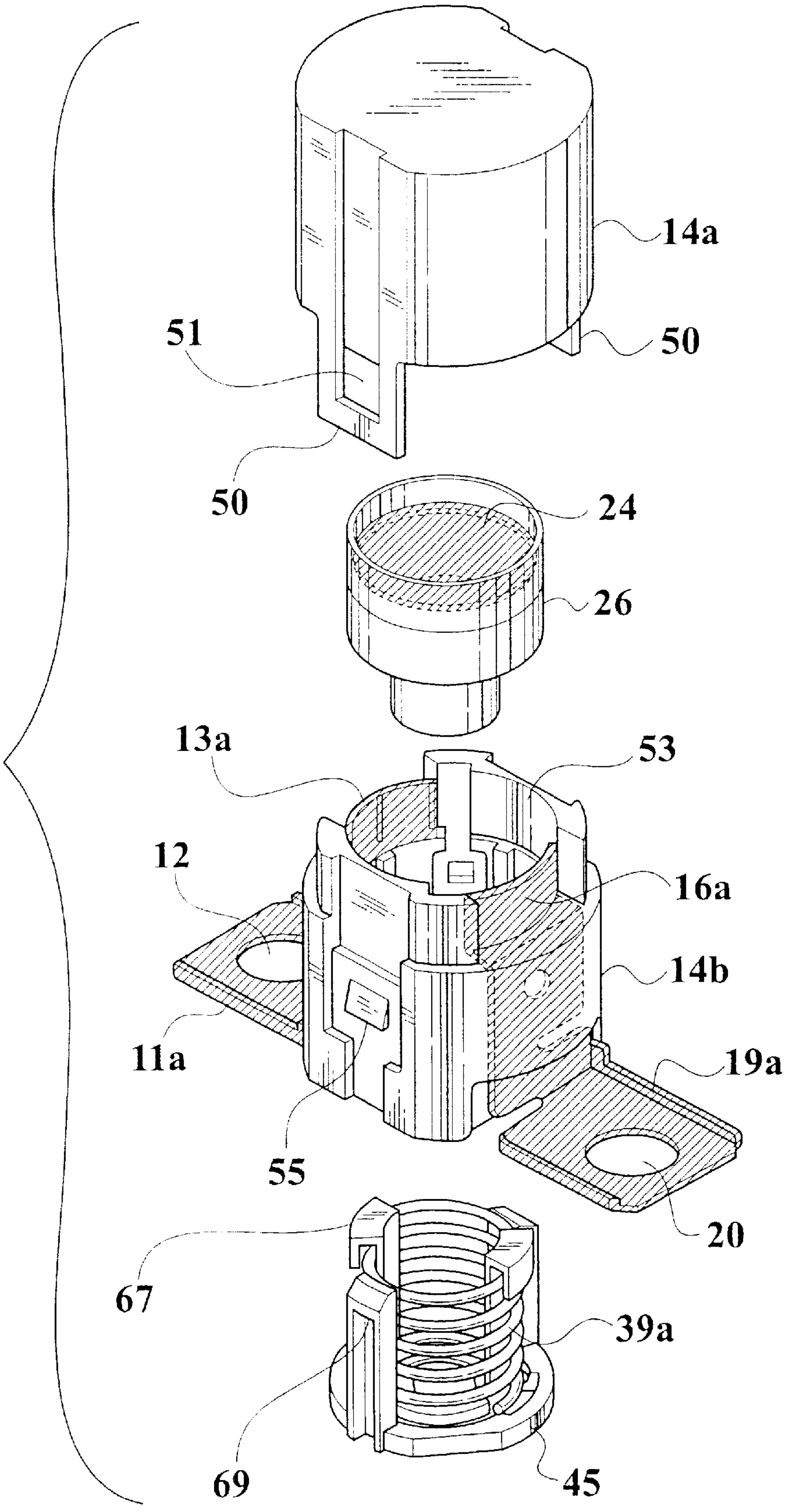
FIG. 4 is an exploded perspective view of the circuit breaker of the embodiment.

In FIG. 4, a cap 14*a* as an upper case is formed with an extended portion 50 having a rectangular groove 51. A resin case 14*b* as a lower case is formed with a wedge-like locking portion 55. If the groove 51 is fitted to the locking portion 55, the cap 14*a* is put on the resin case 14*b*. The cap 14*a* and the resin case 14*b* constitute an outer case, and comprise container made of insulation material such as resin (thermoplastic resin).

The resin case 14*b* is formed with an opening 53 into which a cylindrical thermite case 26 is accommodated. A heating agent 27 and an ignition 29 to which a lead wire 31 is connected are accommodated in the thermite case 26. An upper lid 24 is put on an upper portion of the heating agent.

The thermite case 26 has excellent thermal conductivity, and is not melted by heat of the heating agent 27. It is preferable to use brass, copper, copper alloy, stainless steel or the like as material of the thermite case 26. The thermite case 26 is formed by restriction working or the like of metal, and is shaped into a cylindrical or rectangular parallelepiped shape.

The ignition 29 includes an igniting agent so that the igniting agent is ignited by heat generated by a current flowing through the lead wire 31 when an abnormal condition occurs in the vehicle such as collision accident of the vehicle, thereby allowing the heating agent 27 to generate the thermite reaction heat.

The first buss bar 11*a* having a circular hole 12 and the second buss bar 19*a* having a circular hole 20 are bent upward at right angles, the bent portions are inserted into the resin case 14*b*, and bus bar tip ends 13*a* and 16*a* are respectively in contact with left and right side walls of the thermite case 26 through low-melting metals 23 as low-melting material such as solder (melting point is 200° C. to 300° C.) or the like.

The left and right side walls of the thermite case 26 are bonded to the buss bar tip ends 13*a* and 16*a* by means of the low-melting metals 23, and the first buss bar 11*a* and the second buss bar 19*a* can be electrically connected to each other through the low-melting metals 23 and the thermite case 26.

The low-melting metal 23 is made of at least one metal selected from Sn, Pb, Zn, Al and Cu.

The heating agent 27 is made of metal-oxide powder such as ferric oxide ($Fe_2O_3$) and aluminum powder, and is thermite agent which thermite-reacts by heat of the lead wire 31 to generate high heat. The thermite case 26 is charged into the thermite case 26 which is a metal container for moisture proofing. Chromic oxide ($Cr_2O_3$), manganese oxide ($MnO_2$) or the like may be used instead of ferric oxide ($Fe_2O_3$).

The heating agent 27 may be made of mixture comprising at least one metal powder selected from B, Sn, FeSi, Zr, Ti and Al; at least one metal selected from CuO, $MnO_2$, $Pb_3O_4$, $PbO_2$, $Fe_3O_4$ and $Fe_2O_3$; and at least one additive comprising alumni bentonite and talc. Such a heating agent is easily ignited by the ignition 29, and the low-melting metal 23 can be melted within a short time.

A retainer 45 made of resin is disposed in the opening 53 of the resin case 14*b* and in a lower portion of the thermite case 26. A compression spring 39*a* is accommodated in the retainer 45 in a compressed manner. The retainer 45 is attached to and detached from the resin case 14*b*. When the retainer 45 is attached to the resin case 14*b*, the retainer 45 is disposed in the vicinity or in contact with the thermite case 26, and constitutes an attaching/detaching member which is melted by heat of the heating agent 27.

As shown in FIG. 5, the retainer 45 comprises a base 61, notches 63 formed in the base 61, retainer bellies 65 embedded uprightly with respect to the notches 63, a pair of retainer locking portions 67 formed on tip ends of the retainer bellies 65, and projecting case mounting claws 69 for mounting the retainer 45 to the resin case 14*b*.

The resin case 14*b* is formed with grooves 15 in correspondence with the case mounting claws 69 formed on the retainer 45 so that the case mounting claws 69 are fitted into the grooves 15 formed in the resin case 14*b*.

The compression spring 39*a* which is helically wound around the retainer locking portions 67 is disposed outside the retainer bellies 65. A tip end of the compression spring 39*a* is locked by the retainer locking portions 67. That is, the compression spring 39*a* is sandwiched in the retainer 45 in the compressed state. The retainer locking portions 67 and portions of the retainer bellies 65 are strongly in contact with the thermite case 26.

Next, the operation of the circuit breaker of the embodiment having the above-described structure will be explained with reference to the drawings.

First, the retainer 45 is mounted to the resin case 14*b*. The pair of retainer locking portions 67 are first bent inward, the compression spring 39*a* is pushed into the retainer 45, and the compression spring 39*a* is assembled into the retainer 45.

After the compression spring 39*a* is assembled into the retainer 45, the retainer 45 into which the compression spring 39*a* is assembled is inserted into the opening 53 from below the resin case 14*b*, the case mounting claws 69 formed on the retainer 45 are fitted to the grooves 15 formed in the resin case 14*b*, thereby mounting the retainer 45 to the resin case 14*b*. At that time, the retainer 45 to which the compression spring 39*a* is mounted is in strong contact with a side wall at the side of the ignition 29 in the thermite case 26.

That is, the compression spring 39*a* can easily be mounted to the retainer 45 and the retainer 45 can easily be mounted to the resin case 14*b* only by bending the retainer locking portions 67 inwardly and pushing the compression spring 39*a* into the retainer 45.

Next, the operation of interrupting the circuit in a state in which the retainer 45 is mounted to the resin case 14*b* will be explained.

First, the first buss bar 11*a* and the second buss bar 19*a* are electrically connected to each other through the low-melting metals 23 and the thermite case 26, and a current is supplied from the battery (not shown) to the load (not shown).

Next, when the vehicle collides against an obstacle or the vehicle falls from a cliff, the collision sensor or the like detects an abnormal condition of the vehicle. If the abnormal condition of the vehicle is detected, a current flows to the ignition 29 through the lead wire 31.

Then, the ignition 29 is ignited by heat generated by the current and therefore, the heating agent 27 which is a thermite agent generates a thermite reaction heat according to the following reaction expression:

$$Fe_2O_3+2Al\rightarrow Al_2O_3+2Fe+386.2\ \text{Kcal}$$

The thermite case 26 is heated by the thermite reaction heat, the low-melting metals 23 is heated by heat of the heating agent 27 and heat of the thermite case 26 and melted. At the same time, the retainer locking portions 67 compressing the compression spring 39*a* and fixing the latter to the retainer 45 are melted by the heat. Then, since the compression spring 39*a* is stretched as shown in FIG. 6, the thermite case 26 jumps up in a direction of the gap 14*a*.

Thus, the electrical connection between the thermite case 26 and the first and second bus bars 11*a* and 19*a* is interrupted. That is, the electric circuit of the vehicle is interrupted.

As described above, according to the circuit breaker of the embodiment, the signal indicative of abnormal condition from the vehicle is input to ignite the ignition 29, thereby causing the thermite reaction by the heating agent 27, and the low-melting metals 23 and the retainer locking portions 67 are melted by the thermite reaction heat and thus, the compression spring 39*a* instantaneously jumps up. Therefore, it is possible to reliably interrupt the electric circuit of the vehicle within a short time, and to protect electrical parts.

Further, the retainer locking portions 67 of the retainer 45 are disposed inside the compression spring 39*a*. Therefore, there is a tendency that the retainer locking portions 67 fall inwardly by a reaction force of the compression spring 39*a*, the thermite case 26 and the retainer 45 come into strong contact with each other. Therefore, thermal conductivity from the thermite case 26 to the retainer 45 becomes excellent, and it is possible to melt the retainer locking portions 67 efficiently.

Further, the compression spring 39*a* can easily be mounted to the retainer 45 and the retainer 45 can easily be mounted to the resin case 14*b* only by bending the retainer locking portions 67 inwardly and pushing the compression spring 39*a* into the retainer 45.

Further, if the case mounting claws 69 formed on the retainer 45 are tilted inward from the grooves 15 formed in the resin case 14*b*, the retainer 45 can easily be separated from the resin case 14*b*. Therefore, it is possible to easily attach and detach the retainer 45 to and from the resin case 14*b*.

The compression spring 39*a* is held by the retainer 45 and thus, no external force is applied to the connected portion between the thermite case 26 and the first and second bus bars 11*a* and 19*a*, i.e., the low-melting metals 23. Therefore, it is possible to enhance the reliability of the connected portion.

A sub-assembly of the compression spring 39*a* and the retainer 45 is inserted from a fuse lower surface, i.e., from the opening 53 of the resin case 14*b*. Therefore, the assembling operation of the entire circuit breaker is facilitated. Further, after the circuit is interrupted, if the retainer 45 and the thermite case 26 are replaced by new ones, the resin case 14*b* can be used again as it is as a fuse.

Further, since the cap 14*a* is put on the resin case 14*b*, the thermite case 26 will not jump out from the cap 14*a* when the circuit is interrupted, and this can prevent a burn caused by heat.

Figure 7:
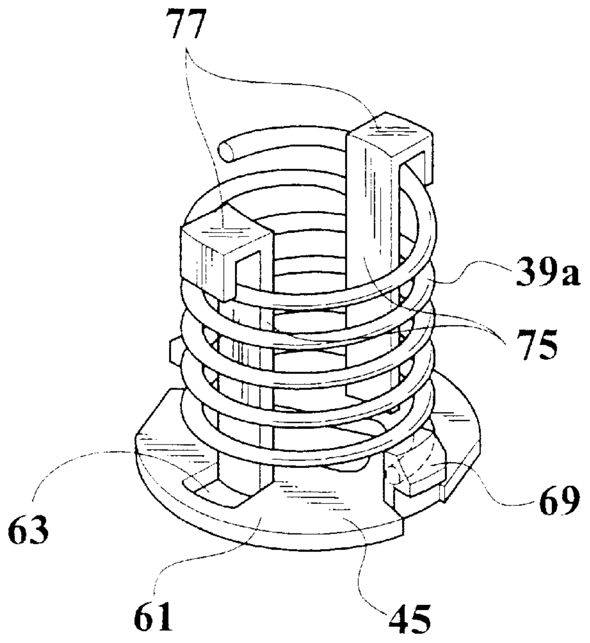
FIG. 7 is a view of another retainer of the circuit breaker of the embodiment before the circuit is interrupted.
Figure 8:
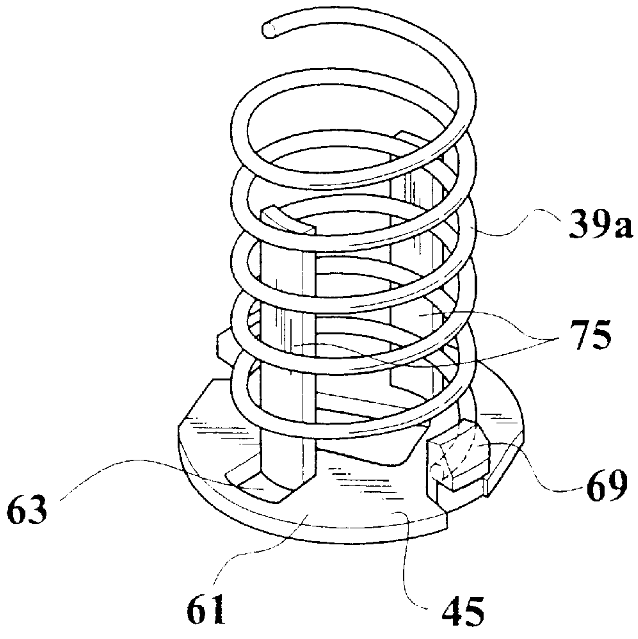
FIG. 8 is a view of the other retainer of the circuit breaker of the embodiment after the circuit is interrupted.

Next, an example in which another retainer is assembled into the circuit breaker will be explained. FIG. 7 is a view of another retainer of the circuit breaker of the embodiment before the circuit is interrupted, and FIG. 8 is a view of the other retainer of the circuit breaker of the embodiment after the circuit is interrupted.

The other retainer shown in FIG. 7 comprises a base 61, notches 63 formed in the base 61, retainer bellies 75 embedded with respect to the notches 63 and the base 61, a pair of metal locking portions 77 formed on tip ends of the retainer bellies 75, and a projecting case mounting claws 69 for mounting the retainer 45 to the resin case 14*b*.

The pair of metal locking portions 77 and the retainer bellies 75 are made of low-melting metal as low melting point such as Solder (melting point is 200° C. to 300° C.) which is melted by heat of the heating agent 27.

If the other retainer having such a structure is mounted to the resin case 14*b*, the metal locking portions 77 which compress the compression spring 39*a* by heat of the heating agent 27 and the thermite case 26 and fix the compression spring 39*a* to the other retainer are melted by the heat. Then, the compression spring 39*a* is stretched as shown in FIG. 8, the thermite case 26 jumps up in the direction of the gap 14*a*, and the electric circuit of the vehicle is interrupted.

Although the compression spring 39*a* and the low-melting metals 23 are provided, and the circuit is interrupted when the retainer 45 and the low-melting metals 23 are melted in the embodiment, only the retainer 45 may be provided without providing the low-melting metals 23, and the circuit may be interrupted when the retainer 45 is melted. It is of course possible to make various modifications without departing from the scope of the invention.

What is claimed is:

1. A circuit breaker comprising:

a first connecting terminal and a second connecting terminal;

a heating portion movably disposed in electrical contact with and between the first connecting terminal and the second connecting terminal, the heating portion charged with a heating agent;

an igniting portion for igniting the heating agent charged in the heating portion;

an outer case accommodating the ignition portion and the heating portion; and an extendable resilient member mounted to a removable member in a compressed state, the removable member being configured to removably engage with the outer case such that when the removable member is engaged with the outer case, the removable member is located in the vicinity of the heating portion, whereby, upon ignition of the heating agent, the extendable resilient member extends from the compressed state, exerting force onto the heating portion to move the heating portion from the contact position, such that the electrical connection between the heating portion and the first and second connecting terminals is interrupted.

2. The circuit breaker according to claim 1, wherein:

the removable member comprises a case mounting claw for engagement with the outer case; and the outer case comprises:

a lower case and an upper case configured to be placed on the lower case; and the lower case comprising an opening configured to receive the removable member and a groove configured to engage with the case mounting claw of the removable member.

3. The circuit breaker according to claim 2, wherein the removable member comprises:

a base;

at least one retainer belly extended with respect to the base, the extendable resilient member wound around the retainer belly; and the retainer belly comprising a locking portion formed on one end for locking the extendable resilient member in its compressed state.

4. The circuit breaker according to claim 3, wherein the locking portion is made of a low melting-point metal or resin material so that the locking portion is melted by a heat produced by the heating agent when the heating agent is ignited.

5. The circuit breaker according to claim 1, wherein the tips of the first and the second connecting terminals are connected to an end portion of the heating portion, and a low melting-point metal disposed between the tips and the end portion of the heating portion.

* * * * *